US005800852A

United States Patent [19]

Levinson

[11] Patent Number: 5,800,852
[45] Date of Patent: Sep. 1, 1998

[54] METHOD FOR MAKING A COFFEE/TEA/ BEVERAGE USING A TABLE-BLENDER AND A MICROWAVE-OVEN

[76] Inventor: Melvin L. Levinson, 8 Stratford Cir., Edison, N.J. 08820-1830

[21] Appl. No.: 862,520

[22] Filed: May 23, 1997

Related U.S. Application Data

[63] Continuation-in-part of Ser. No. 370,243, Jan. 9, 1995, Pat. No. 5,635,233.

[51] Int. Cl.[6] .................... A23L 3/00; A21D 6/00; A23F 5/00; A23F 3/34
[52] U.S. Cl. ................. 426/433; 426/435; 426/241; 426/234
[58] Field of Search .................... 426/433, 435, 426/234, 241; 99/297, 289

[56] References Cited

U.S. PATENT DOCUMENTS 2,935,928  5/1960  Keating et al. .
4,345,512  8/1982  Moore ................... 426/234
4,639,375  1/1987  Tsai ...................... 426/597
4,721,835  1/1988  Walker .................. 426/433
5,635,233  6/1997  Levinson ............... 426/433

*Primary Examiner*—Anthony J. Weier

[57] ABSTRACT

The invention concerns increasing the utility of a conventional table blender by providing it with an accessory, filter-pouring cap so that it may be utilized as a coffee, tea and beverage maker. The removable jar and blade assembly of a table blender, containing a brewing coffee or steeping tea, is removed from the blender motor, placed in a microwave oven and heated until hot. Then, the jar, containing the hot brewing beverage, is returned to the blender motor where the brewing is completed. Taught are 1) grinding and pulverizing coffee-beans, coffee-grounds, and tea-leaves in a liquid, 2), with an electric mixer, brewing coffee and steeping tea in water or in a milk product, and 3) pouring and filtering a brewed coffee or tea out of a blender jar through an accessory filter-cover. Taught is an accessory blenderblade assemble that includes a cavitation disk and a cutting blade.

12 Claims, 2 Drawing Sheets

METHOD FOR MAKING A COFFEE/TEA/BEVERAGE USING A TABLE-BLENDER AND A MICROWAVE-OVEN

CROSS-REFERENCE TO RELATED APPLICATIONS

This application is a continuation-in-part of application, "A Microwave Oven Coffee/Tea/Beverage Apparatus and Methods for Its Use," 08/370,243, filed Jan. 9, 1995 now U.S. Pat. No. 5,635,233

BACKGROUND OF THE INVENTION

1. Field of the Invention

The present invention concerns apparatus and methods for preparing coffee, tea or a beverage utilizing a table-blender and a microwave oven.

2. Discussion of the Prior Art

Numerous apparatus have been designed to prepare coffee or tea in a microwave oven. A microwave oven coffee maker consist of a microwave transparent pot or cup, designed to receive a measured quantity of water, and a brewing basket or support surface for the receipt of this measured amount of coffee. The coffee may be loose or packaged in flow-through filter bags. In a microwave oven, water is heated to its boiling point. Thereupon, the hot water is mixed with a predetermined quantity of coffee and brewed or steeped for a predetermined time.

Representative, prior art, patents for or brewing coffee and tea follow: Keating, U.S. Pat. No. 2,935,928; Serio, U.S. Pat. No. 3,174,424; Perlov, U.S. Pat. No. 3,215,060; Freedman, et al., U.S. Pat. No. 4,104,957; Slangan, et al, U.S. Pat. No. 4,233,325; Koral, U.S. Pat. No. 4,381696; Derby, U.S. Pat. No. 4,495,392; Welker, U.S. Pat. No. 4,721,835; Dorby, U.S. Pat. No. 4,756,915; and Katz, U.S. Pat. No. 5,079,396. Each, of these beverage makers, employs its own unique operating sequence to prepare a particular beverage.

The prior art teaches that one can brew coffee by soaking coffee grounds for an extended period of time (for example, six to eight hours or overnight) in water. Prior art teaches to steep tea as follows: 1. Use cold, fresh water. Cold water contains a lot of oxygen that gives the tea its full flavor. 2. Do not overfill the strainer. Tea leaves need room to swell in order to give off their full flavor. 3. Reckon with one-teaspoon (2 g.) per cup, then add one for the pot. 4. Pour water onto the tea the moment it starts to boil. Do not allow it to "over boil" since the oxygen is boiled off. 5. Let the tea stand and draw for about five minutes depending on the type tea. 6. Lift out the tea-holder and stir the tea.

Copending application, "A Microwave Oven Coffee/Tea/ Beverage Apparatus and Methods for Its Use", 08/370,243, filed Jan. 9, 1995, teaches to prepare a water or milk, coffee or tea by placing a predetermined amount of water or milk and coffee grounds or tea leaves into a beverage container. Then, after a predetermined time, inserting a plunger device, that consists of a plunger and a contiguous filter that freely releases from the plunger, into the beverage container. In operation, the plunger forces the contiguous filter to the bottom of the beverage container and there the plunger is uncoupled from the filter and removed from the container. The filter is left at the bottom of the container trapping, between its lower surface and the bottom, of the beverage container, filtered-out spent coffee grounds or tea leaves from the resulting beverage. The copending Specification teaches before inserting the plunger device into the container, beating the mixture, of water and coffee grounds or tea leaves, with an electric mixer for a predetermined time. It teaches heating a milk product and coffee grounds or tea leaves to the denaturing temperature of the milk product, and, thereafter, beating the mixture with an electric beater.

Copending application, "A Microwave Oven Coffee/Tea/ Beverage Apparatus and Methods for Its Use", and this invention concerns the design and operation of a beverage maker. They both concern combining mechanical agitation with temperature and time to result in the brewing of a reliable and reproducible beverage of desirable, strength, aroma and flavor. In the present invention, the plunger filter device, of copending Specification, "A Microwave Oven Coffee/Tea/Beverage Apparatus and Methods for Its Use," is replaced with a detachable pouring cover and a filter. Both inventions teach to agitate a mixture, of hot water and coffee grounds or tea leaves, with the blades of table blender, before and/or after the water and coffee grounds or tea leaves in the blender jar are heated in a microwave oven. Both teach to heat the mixture by removing the jar containing the mixture from the blender motor and heating the removed jar containing the mixture in a microwave oven for the predetermined time before remounting the jar containing the mixture on the blender motor.

Copending Specification, "A Microwave Oven Coffee/ Tea/Beverage Apparatus and Methods for Its Use" and this invention teach the beverage container may be the detachable jar of a conventional table blender, that receives the mixture of water and coffee grounds or tea leaves before it is filtered. An example of a conventional table blender with a detachable jar mounted on a motor is a 120 volts, 375 watts Sunbeam®-Oster® ten speed blender, "Osterizer," Model No. 890-22M.

It is an object of this invention to increase the utility of a conventional table blender by providing an accessory pouring cover and coffee or tea filter so that the conventional table blender may be employed as a preferred coffee, tea and beverage maker.

It is an object of this invention to improve the preparation of coffee or tea by grinding and high speed agitation, with an electric table blender, a mixture of coffee-beans, coffee-grounds or tea leaves and water in the removable jar of a conventional table blender. Thereafter, filtering and pouring out the coffee or tea from the blender's jar while containing spent waste coffee-grounds or tea leaves therein.

The coffee grounds and tea leaves are pulverized while immersed in a liquid 1) to release caffeine, flavor and aroma from the coffee grounds, 2) to emulsify the aroma carrying oil in the brew, and 3) to speed "brewing" of the beverage and 4) to improve the leaching of the coffee and tea leaves. Beating adds oxygen that gives tea its full flavor. Alternately, before the liquid is added, the coffee beans, ground coffee or tea leaves may be pulverized dry in the table blender.

It is an object of this invention to describe a method of preparing coffee and tea by brewing the coffee and steeping the tea in a table blender jar and heating the brewing coffee or tea in the blender jar in a microwave oven.

It is an object of this invention to increase the utility of a conventional table blender by providing a novel, accessory, cavitation/cutting-blade assembly.

It is an object of this invention to obviate the heat wasted when heated water is poured through cool air into a conventional coffee filled filter.

It is an object of this invention to brew coffee grounds and steep tea leaves while they are immersed and dispersed in water so the individual grounds and leaves are not exposed dry and in a clump to microwave energy. Dry and in a clump, coffee ground exposed to microwave energy heat to temperatures that release an undesired bitter taste and prematurely vaporize volatile aromas.

STATEMENT OF THE PRESENT INVENTION

The present invention concerns increasing the utility of a conventional table blender by providing it with an accessory, filter-pouring cap so that it may be utilized as a coffee, tea and beverage maker. The removable jar and blade assembly of the table blender, containing brewing coffee or steeping tea, can removed from the blender motor, placed in a microwave oven and heated therein until hot. Then, the jar, containing the hot brewing beverage, is returned to the blender motor where the brewing is completed.

DESCRIPTION OF THE DRAWINGS

The advantages and benefits resulting from the described table-blender, microwaveoven, coffee-tea-beverage apparatus will become apparent from the following detailed description and by reference to the accompanying drawings in which.

DESCRIPTION OF THE PREFERRED EMBODIMENTS

Figure 1:
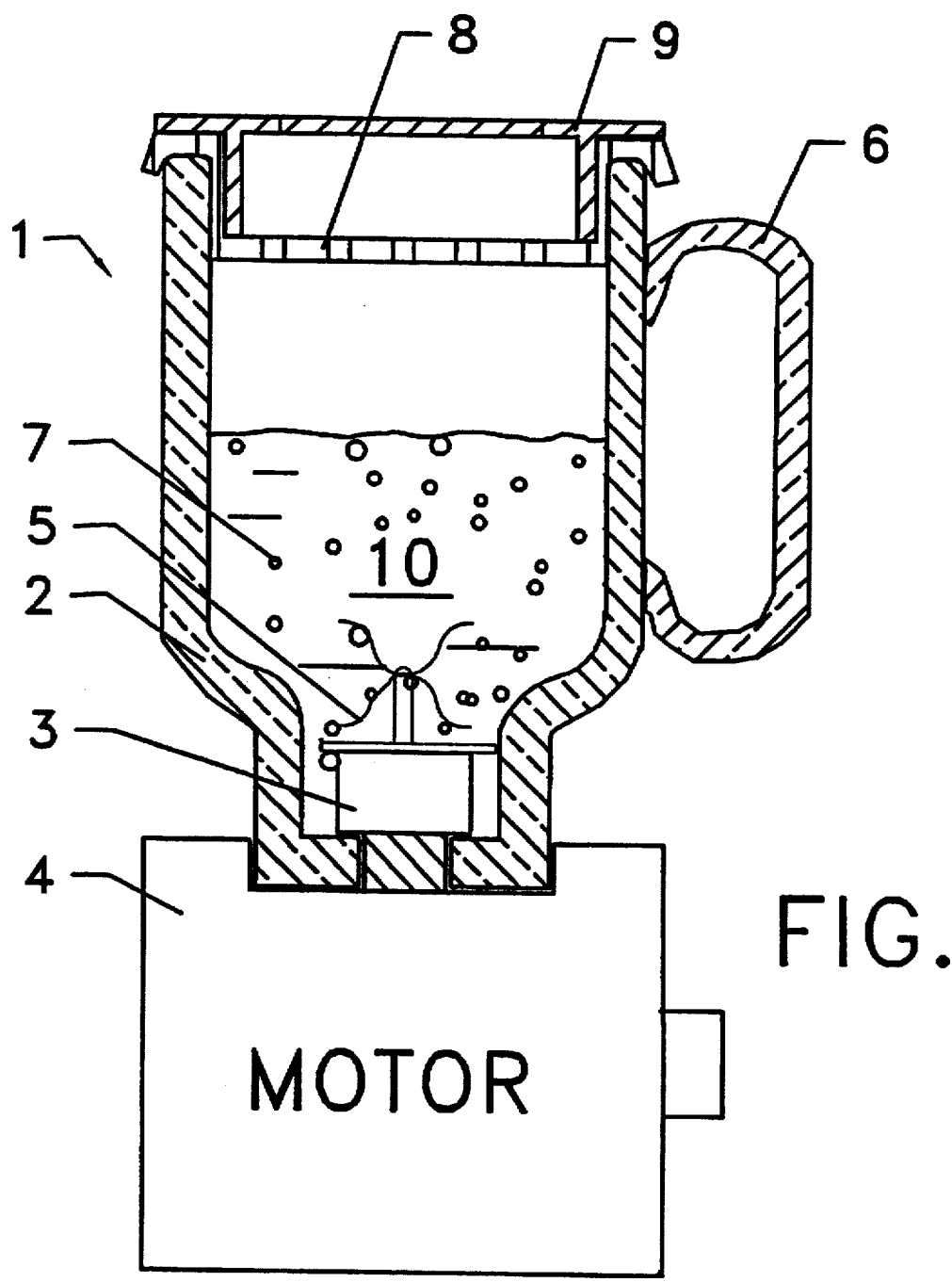
FIG. 1 is a composite view in cross section of a conventional blender design with an improved filter/cap.

FIG. 1 illustrates a conventional table blender 1 that includes jar 2 with a detachable base/blade assembly 3 mounted on motor base 4. In a well-known manner, base assembly 3 is designed to facilitate the attachment of jar 2 to motor base 4 and the removal of jar 2 from motor base 4. In a well known manner, base assembly 3 with its removable blades 5 attaches to the open bottom of jar 2 and turns it into a liquid container.

In a well known manner, jar 2 is provided with a handle 6 that facilitates the placement of jar 2 on motor base 4, the removal of jar 2 from motor base 4, the transportation of jar 2 in and out of a microwave oven (not shown) and the tilting of jar 2 to filter out its contents.

In operation, in FIG. 1, a predetermined amount of coffee beans, coffee grounds or tea leaves 7 are placed into blender jar 2. A square sheet (circa ⅛ inches thick), of an open pore plastic foam filter 8 that is larger in diameter than the diameter of the open top of jar 2, is placed on jar 2. After plastic foam filter 8 is placed on jar 2, a pouring cover 9 (FIG. 1 and 4), from above and in contact with plastic foam filter 8, is employed to manually urge filter 8 into the open top of jar 2.

Cover 9 secures plastic foam filter 8 in the open top of jar 2 where it remains until it is physically removed. Cover 9 has a pouring spout 11 illustrated in FIG. 4.

When jar 2 is tilted, to pour off the filtered beverage, care must be taken so that the weight of the beverage 10 does not dislodge filter 8. Care must be taken, for example, with a clamp, rubber band or other well known way, to secure cover 9 on the open top of jar 2. When used in a microwave oven, filter 8 may be fabricated of plastic, cloth or paper or other non-lossy material. Alternately, a filter, larger in circumference than the open top of jar 2, may be folded over the outside of the open top of jar 2 and secured in place with a common rubber band (not shown).

When the preparation of beverage 10 is completed, jar 2 is removed from motor base 4 and beverage 10 is filtered by plastic foam filter 8 as it is poured out of jar 2. After the beverage is poured out of jar 2, the soiled, plastic foam filter 8 and the spent coffee grounds or tea leaves 7 are easily removed from jar 2.

The shape of plastic foam filter 8 is selected to complement the shape of the open top of jar 2. Small tabs (not shown) may be employed to project from the circumference of the foam filter 8 to aide in centering and maintaining foam filter 8 horizontal when cover 9 urges it into the open top of jar 2. Preferably, plastic foam filter 8 is a ¼ inch thick, soft, open-pore, polyurethane foam 8.

Many filter materials are suitable for filter 8, for example, common paper toweling. Foam filter 8 may be fabricated from EZ>>>ONE™ Sponge Towels, Nation/Ruskin Inc., Montgomeryville, Pa. 18936. Note, because the blender quickly and fully brews or steeps the beverage, the use of common drip coffee maker filter paper that is intentionally fabricated with small holes to increase brewing time is unnecessary and is counter indicated.

Some may prefer that their beverage includes a sediment of spent coffee or tea leaves and will chose a filter that permits sediment to pass there through. Others may desire complete filtering and no passage of sediment. When a, circa, eighty-gauge, open-pore, polyurethane filter is used a minor amount of tasty "sediment" may pass through the filter into the finished beverage. The time honored way of dealing with sediment is that if you like its taste you stir the beverage and if you do not like its taste wait until it sinks to the bottom of the cup before consuming the beverage.

Not shown a thin, paper filter may be employed alone or combined with plastic foam filter 8. One may place a flat, disposable, paper filter, that is larger in circumference than foam filter 8 beneath foam filter 8 to further simplify clean up.

Coffee beans, coffee ground or tea leaves either dry or preferably immersed ill a liquid are placed in jar 2. Filter 8 and cover 9 are secured to the open top of jar 2. Motor 4 is energized and the coffee beans or coffee grounds are pulverized by blades 5. Surprisingly the coffee beans, coffee grounds or tea leaves immersed in a liquid, when exposed to the shearing action of high speed cutting blades 5, pulverize as effectively in the liquid as they would if no liquid was present.

Preferably, a predetermined amount of coffee beans or tea leaves are pulverized in a predetermined amount of water or a milk product. Pulverizing the coffee beans or tea leaves, in a liquid in a table blender 1) swiftly leaches the nourishment from the coffee beans or tea leaves and 2) results in a beverage with more body, aroma and flavor.

Preferably, after an initial blending, brewing and steeping of the cold coffee or tea mixture in jar 2, jar 2 containing the mixture is removed from motor base I and heated to a predetermined temperature in a microwave oven (not shown). If desired, a microwave temperature probe (not shown) may be employed. Thereafter, heated jar 2 and its hot contents are returned to motor base 3 and blended until the beverage is fully developed.

When one pulverizes coffee grounds or tea and, thereafter, prepares coffee or tea from the resulting "powder" the result is a rich, tasty beverage. Employing a high speed table blender to pulverized coffee beans or grounds in a hot liquid, results in a beverage that is fully "brewed" in a fraction of the preparation time taught in prior art coffee apparatus.

Most seek the "Ideal" cup of coffee as defined by the "Coffee Brewing Control Chart" available from the Coffee Brewing Institute, Inc. 120, Wall Street, New York, N.Y. 10005. Coffee is described as ideal, weak, strong, underdeveloped, or bitter. In the apparatus of this invention, it is possible to prepare "ideal" coffee using the circa 200° F. temperatures and the long steeping or brewing times recommended in the prior art. But, surprisingly, the apparatus, of this invention, brews or steeps "ideal" coffee or tea, in a microwave oven, at brewing temperatures and brewing times not considered practical in the prior art. Surprisingly, the table blender apparatus and methods, of this invention, prepares a beverage, with a rich taste and full body, at temperatures substantially below those recommended in the prior art.

Figure 4:
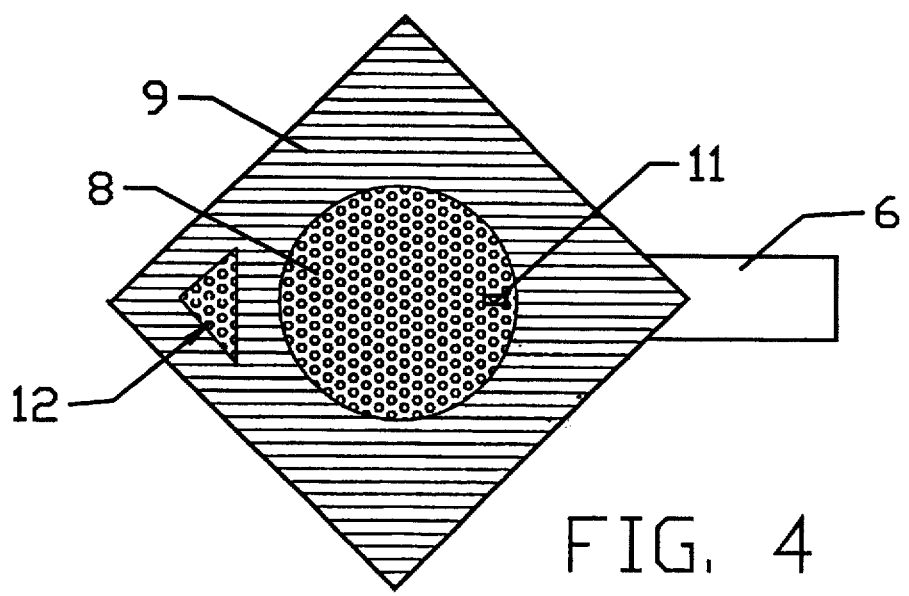
FIG. 4 is a top view of FIG. 1 illustrating a pouring cover design.

Since filter 5 depends on the weight of the liquid it filters to force liquid through it, preferably an air passage, for example, illustrated in FIG. 4, a small ¼ inch hole 11 remote from the pouring spout 12, is placed in filter 8. Air passing through hole 11, prevents a vacuum from forming inside of jar 2 that can slow the release of beverage 10 from jar 2.

Figure 2:
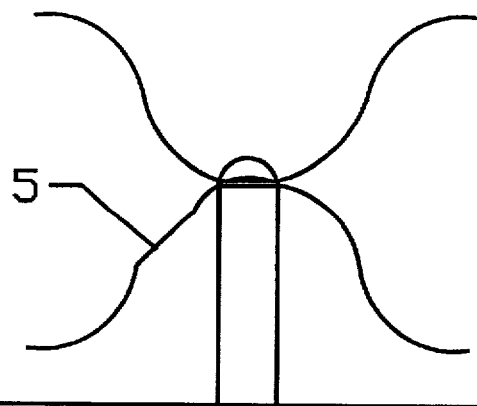
FIG. 2 is a side view a removable cutting blade assembly of a prior-art table blender.

The filter in the copending Specification works swiftly and effectively because it is mechanically forced to the bottom of the container by a plunger. As illustrated in FIG. 2, because at the bottom of the container in a conventional table blender two of the knife points of blade 3 aim upwards, it is not practical to force, as taught in the copending Specification, a contiguous filter to the bottom of the container.

Figure 3:
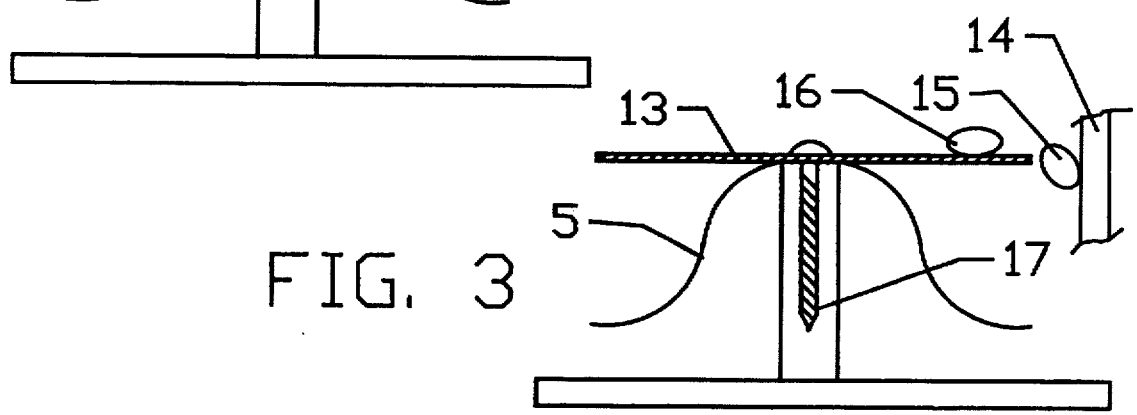
FIG. 3 is a side view of a novel, combination, tableblender, cavitation and cutting-blade assembly.

FIG. 3 illustrates a novel accessory blade arrangement that increases the utility of both this and my copending apparatus. In FIG. 3 the two upward projecting blades of the conventional blade assembly, illustrated in FIG. 2, are bent so that the two formally upper blades 17 project downwards. This doubles the number of blades that project downward. A flat cavitation disk 13 is fastened on top of blades 5 and 17 as illustrated. With the blade arrangement illustrated in FIG. 3 there are no upward projecting blades 5 that if present would damage the contiguous filter of the copending Specification.

With the blade arrangement illustrated in FIG. 3, in operation, coffee beans 16, in contact with either the top or bottom surface of disk 13, are thrown by centrifugal force against wall 14 of jar 2. By design, coffee bean 15 is free to fall between the circumference of disk 13 and wall 14 of jar 2 into the confined space occupied by blades 5 and 17. Coffee beans confined beneath disk 13 by the centrifugal force of disk 13 and are rapidly pulverized.

After the coffee is brewed and filtered out of jar 2 and jar 2 is washed, the filtered coffee and a milk product may be placed back into the clean jar 2 and motor 4 is energized, whereupon, cavitation disk 13 creates a desirable milk froth. This operation obviates the need for dedicated expresso coffee and cappuccino makers.

It is expected that a single motor will be provided with two or more jars and an assortment of different blade assemblies. Some of the jars may be employed heating a beverage in a microwave oven while at the same time other jars, in place on a blender motor, may be used either as taught in the prior art or as taught, herein, brewing coffee and frothing toppings.

Espresso coffee is in contemplation. Surprisingly, when one follows the teachings of this invention and decreases the amount of liquid and increases the amount of coffee grounds and beating time, a filtered brew may be prepared that appears and tastes like a brew prepared from "espresso" coffee grounds in an espresso coffee maker.

GENERAL COMMENTS

It is expected that some will heat water or milk conventionally, for example, in a pot over the open burners of a conventional range or in a container in a microwave oven and then the hot water is poured into jar 2 onto the coffee grounds. The hot water poured into jar 2 will rapidly cool because it must heat the large mass of jar 2 and base assembly 3.

In contrast, in the instant invention, 1) removing jar 2, with a beverage initially brewing therein, from blender motor 4, 2) heating jar 2 and its contents in microwave oven (not shown), and 3) returning jar 2 and its hot, partially-brewed contents to blender motor 4 to complete its brewing results in a hotter more fully brewed final beverage. Advantageously, in the instant invention, heat stored in the mass of jar 2 and base assembly 3 may be used to extend the time that the beverage may be served hot.

Coffee or tea, heated, to circa 130°–180° F. and then beaten, as taught herein, provides a full-bodied beverage that does not require a long cooling time before it can conveniently be consumed. Preferably, the coffee and tea are brewed, steeped and beaten at lower water temperatures than recommended in the prior art. At high temperatures bitter taste may develop and flavor and aroma may be lost.

Exposed to microwave energy, the individual coffee grounds or tea leaves should not be confined in a dry pile that may heat to an excessively high temperature, but they should be exposed to microwave energy dispersed in water. For use in a microwave oven, jar 2 is constructed of microwave-permeable material as ovenable plastic, ceramic or glass.

A well-known way, of preparing coffee, is to soak coffee grounds in room temperature water over night, filter the resulting beverage, and, thereafter, consume it hot or cold. Surprisingly, the apparatus and methods, of this invention, may be employed to improve on this method. In jar 2, place a predetermined mixture of water and coffee grounds or tea leaves. Add ice cubes and, with filter 8 and cover 9 in place, energize the table blender 1 until the ice is crushed and melted and a desired ice coffee is "brewed" or a desired ice tea is "steeped." After the beverage is filtered additional ice cubes may be added.

Preferably, after each use, jar 2 is emptied of its soiled filter and waste by-products. Clean wash water is added. The blender is assembled and energized and it washes itself.

If, after cleaning, spent coffee grounds or spent tea leaves and sediment remain, undesirably, in the plastic filter, the plastic filter, per se, may be washed in a dishwasher or washing machine or simply replaced. Preferably, place plastic filter, in a sink, beneath running water, and brush it clean with a kitchen dish brush.

Although this invention has been described with a certain degree of particularity, it is understood that the present disclosure has been made by way of example and that numerous changes in details of construction and arrangement of parts may be resorted to without departing from the spirit and scope of the invention. It should be understood that the shape, of the jar 2, need not be square, but may be, for example, circular.

I claim:

1. A method, for preparing coffee or tea using a table-blender and a microwave-oven that includes the steps of:

selecting a table blender that comprises a jar and a motor base, where said jar consists of a microwave-permeable jar open at its top and bottom and a jar base and metal blade assembly and where said jar base and blade assembly seals the bottom of said jar and is designed to facilitate the placement of said jar on said motor base and the removal of said jar from said motor base, adding coffee beans, coffee grounds or tea leaves to said blender jar, adding a liquid, adding a coffee or tea filter to said open top of said jar and employing means to prevent gravity from dislodging said filter when said liquid is poured out of said jar through said filter, energizing said motor so that said metal blades pulverize said coffee or tea and forcefully agitate and mix said liquid and said coffee grounds or tea leaves to initiate the brewing of said coffee or said tea in said liquid, removing said jar containing said brewing mixture of said coffee grounds or tea leaves and said liquid from said motor base, heating said jar containing said mixture of said brewing coffee grounds or tea leaves and said liquid in said microwave oven for a predetermined time, pouring the resultant brewed coffee or tea out of said jar through said filter.

2. A method for preparing coffee or tea using a table-blender and a microwave-oven, according to claim 1, that includes the steps of:

after heating said removed jar containing said mixture of said coffee grounds or tea leaves and said liquid in said microwave oven for a predetermined time replacing said blender jar on said motor base, and subsequently energizing said motor so that said metal blades forcefully agitate said hot brewing coffee grounds or tea leaves and said liquid to a predetermined brew.

3. A method for preparing coffee or tea in a table blender, according to claim 2, that includes the steps of:

before removing said jar from said motor base, and heating said removed jar containing said mixture of said coffee or tea and said liquid in a microwave oven for a predetermined time, energizing said motor and said blades to initiate the brewing of said coffee or the steeping of said tea.

4. A method for preparing coffee or tea using a table-blender and a microwave-oven, according to claim 1, where said liquid is water.

5. A method for preparing coffee or tea using a table-blender and a microwave-oven, according to claim 1, where said liquid is a liquid milk product selected from the group consisting of powdered milk, evaporated milk, whole milk, half-and-half milk, and cream.

6. A method for preparing coffee or tea using a table-blender and a microwave-oven, according to claim 1, wherein said filter is a compressible, open-pore plastic whose circumference is larger than the circumference of said open top of said jar, wherein said means to prevent gravity from dislodging said filter when said liquid is poured out of said jar through said filter is a jar cover, and wherein said filter is placed over the open top of said jar and secured to said open top of said jar.

7. A method for preparing coffee or tea in a table-blender microwave-oven, according to claim 1, that includes the step of:

heating said jar containing said mixture of said brewing coffee grounds or tea leaves and said liquid in said microwave oven to, at least, 190° F.

8. A method for preparing coffee or tea in a table-blender microwave-oven, according to claim 1, that further includes the steps of:

after heating said removed jar containing said brewing mixture of said coffee grounds or tea leaves and said liquid in said microwave oven for a predetermined time replacing said blender jar on said motor base, adding ice cubes to prepare ice coffee or ice tea and energizing said motor so that said metal blades forcefully agitate said brewing mixture of said coffee grounds or tea leaves, said liquid and said ice cubes.

9. A method, for preparing a liquid foodstuff using a table blender and a microwave oven that includes the steps of:

selecting a table blender that comprises a blender jar and a motor base; where said blender jar consists of a microwave permeable jar open at its top and bottom and a jar base which includes a metal blade assembly; where said jar base and blade assembly seals the bottom of said jar; where said blender jar is designed to operate on said motor base; where said blender jar is designed to be removed from said motor base;

adding said liquid foodstuff to said blender jar, removing said blender jar containing said liquid foodstuff from said motor base, heating said liquid foodstuff contained in said blender jar in said microwave oven for a predetermined time, replacing said blender jar on said motor base, and subsequently energizing said motor so that said blade assembly blends said heated liquid foodstuff to a predetermined consistency.

10. A method for preparing a liquid foodstuff in a table blender and in a microwave oven, according to claim 9, that includes the step of:

before removing said blender jar from said motor base, and heating said removed blender jar, containing said liquid foodstuff, in said microwave oven for said predetermined time, energizing said motor so that said blade assembly blends said ingredients of said liquid foodstuff to a predetermined initial consistency.

11. A method for preparing a liquid foodstuff in a table blender and in a microwave oven, according to claim 9, that further includes the steps of:

securing a liquid filter to the open top of said blender jar and filtering said liquid foodstuff through said filter.

12. A method for preparing a liquid foodstuff in a table blender, according to claim 9, where said liquid is a liquid milk product selected from the group consisting of powdered milk, evaporated milk, whole milk, half-and-half milk, and cream.

* * * * *